United States Patent
Suryawanshi et al.

(10) Patent No.: US 9,260,648 B2
(45) Date of Patent: Feb. 16, 2016

(54) METHOD OF TREATING A HIGH-TEMPERATURE WELL WITH A FLUID CONTAINING A VISCOSIFIER AND A STABILIZER PACKAGE

(71) Applicant: HALLIBURTON ENERGY SERVICES, INC., Houston, TX (US)

(72) Inventors: Prerana U. Suryawanshi, Pune (IN); Achala V. Danait, Pune (IN); Rajendra A. Kalgaonkar, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 74 days.

(21) Appl. No.: 13/895,218

(22) Filed: May 15, 2013

(65) Prior Publication Data

US 2014/0342952 A1 Nov. 20, 2014

(51) Int. Cl.
| | |
|---|---|
| C09K 8/12 | (2006.01) |
| C09K 8/40 | (2006.01) |
| C09K 8/42 | (2006.01) |
| C09K 8/66 | (2006.01) |
| C09K 8/68 | (2006.01) |
| C09K 8/74 | (2006.01) |
| C09K 8/84 | (2006.01) |
| C09K 8/88 | (2006.01) |

(52) U.S. Cl.
CPC ... *C09K 8/12* (2013.01); *C09K 8/40* (2013.01); *C09K 8/42* (2013.01); *C09K 8/665* (2013.01); *C09K 8/68* (2013.01); *C09K 8/74* (2013.01); *C09K 8/845* (2013.01); *C09K 8/882* (2013.01)

(58) Field of Classification Search
CPC ........ C09K 8/68; C09K 2208/34; C09K 5/10; C09K 8/032; C09K 8/06; C09K 8/52; C09K 8/5753; C09K 8/66; C09K 8/805; C09K 8/82; C09K 8/588; E21B 47/00; E21B 33/064; E21B 44/00; E21B 10/25; E21B 34/06; E21B 43/16; E21B 10/5735; E21B 15/003; E21B 15/006; E21B 19/24; E21B 21/003; E21B 23/00; E21B 23/06; E21B 29/02; E21B 33/12; E21B 17/085; E21B 17/18; E21B 19/00; E21B 19/006; E21B 19/16; E21B 19/165; E21B 2033/005; E21B 2034/005; E21B 21/00; E21B 21/06; E21B 21/08; E21B 21/14; E21B 23/01; E21B 23/04
See application file for complete search history.

(56) References Cited

U.S. PATENT DOCUMENTS

| | | | |
|---|---|---|---|
| 4,515,635 A | 5/1985 | Rao et al. | |
| 4,555,269 A | 11/1985 | Rao et al. | |
| 4,557,763 A | 12/1985 | George et al. | |
| 4,592,850 A * | 6/1986 | Castner | C09K 8/588 166/275 |
| 4,640,942 A | 2/1987 | Brothers | |
| 4,676,317 A | 6/1987 | Fry et al. | |
| 4,736,005 A * | 4/1988 | Castner | C08F 220/56 507/225 |
| 5,028,341 A * | 7/1991 | Liao | C09K 8/24 106/38.35 |
| 5,028,342 A | 7/1991 | Opitz et al. | |
| 5,305,832 A | 4/1994 | Gupta et al. | |
| 5,458,197 A * | 10/1995 | Chan | C09K 8/52 166/304 |
| 6,063,737 A * | 5/2000 | Haberman | C09K 8/424 166/291 |
| 6,268,406 B1 | 7/2001 | Chatterji et al. | |
| 7,528,095 B2 | 5/2009 | Maresh | |
| 7,541,316 B2 | 6/2009 | Maresh | |
| 7,749,941 B2 | 7/2010 | Maresh et al. | |
| 2007/0256836 A1 | 11/2007 | Welton et al. | |
| 2008/0039345 A1* | 2/2008 | Kippie | C09K 8/12 507/119 |
| 2013/0098618 A1 | 4/2013 | Braganza et al. | |
| 2013/0264060 A1* | 10/2013 | De Wolf | C09K 8/528 166/305.1 |
| 2013/0267446 A1* | 10/2013 | De Wolf | C09K 8/528 507/241 |
| 2013/0274154 A1* | 10/2013 | Nasr-El-Din | C09K 8/72 507/241 |
| 2013/0274155 A1* | 10/2013 | Nasr-El-Din | C09K 8/035 507/241 |
| 2013/0281329 A1* | 10/2013 | De Wolf | C09K 8/035 507/241 |
| 2013/0324443 A1* | 12/2013 | Wang | C04B 24/163 507/121 |
| 2014/0116710 A1* | 5/2014 | Naser-El-Din | C08K 5/16 166/308.3 |

FOREIGN PATENT DOCUMENTS

| | | |
|---|---|---|
| WO | WO 9309201 A1 | 5/1993 |
| WO | WO 2012061147 A1 | 5/2012 |

OTHER PUBLICATIONS

Halliburton Energy Service, Inc., BARABUF, Alkalinity, pH, Hardness Control, Halliburton Product Sheet, 2010.
Halliburton Energy Service, Inc., BARACARB, Bridging Agent, Halliburton Product Sheet, 2013.

* cited by examiner

*Primary Examiner* — Susannah Chung
*Assistant Examiner* — Kumar R Bhushan
(74) *Attorney, Agent, or Firm* — McGuireWoods LLP

(57) ABSTRACT

A treatment fluid for treating a portion of a high-temperature subterranean formation comprises: a base fluid, wherein the base fluid comprises water; a viscosifier, wherein the viscosifier is a polymer, and wherein the viscosifier is thermally stable up to a temperature of 325° F.; and a stabilizer package, wherein the stabilizer package: (A) comprises a first stabilizer and a second stabilizer, wherein the first stabilizer is an oxygen scavenger and the second stabilizer is a pH adjustor; and (B) is capable of increasing the thermal stability of the viscosifier to a temperature greater than 350° F., wherein the portion of the subterranean formation has a bottomhole temperature greater than 350° F. A method of treating a high-temperature subterranean formation comprises introducing the treatment fluid into the portion of the subterranean formation.

18 Claims, 1 Drawing Sheet

US 9,260,648 B2

METHOD OF TREATING A HIGH-TEMPERATURE WELL WITH A FLUID CONTAINING A VISCOSIFIER AND A STABILIZER PACKAGE

TECHNICAL FIELD

Viscosifiers are used to suspend undissolved solids in an oil or gas well treatment fluid. The treatment fluid can be a completion fluid. A high-temperature viscosifier and stabilizer package for use in a treatment fluid is provided. The treatment fluid can be used in a high-temperature well.

SUMMARY

According to an embodiment, a treatment fluid for treating a portion of a high-temperature subterranean formation comprises: a base fluid, wherein the base fluid comprises water; a viscosifier, wherein the viscosifier is a polymer, and wherein the viscosifier is thermally stable up to a temperature of 325° F.; (163° C.) and a stabilizer package, wherein the stabilizer package: (A) comprises a first stabilizer and a second stabilizer, wherein the first stabilizer is an oxygen scavenger and the second stabilizer is a pH adjustor; and (B) is capable of increasing the thermal stability of the viscosifier to a temperature greater than 350° F. (177° C.), wherein the portion of the subterranean formation has a bottomhole temperature greater than 350° F. (177° C.).

According to another embodiment, a method of treating a high-temperature subterranean formation comprises: introducing the treatment fluid into the portion of the subterranean formation, wherein the subterranean formation has a bottomhole temperature greater than 350° F. (177° C.).

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Figure 1A:
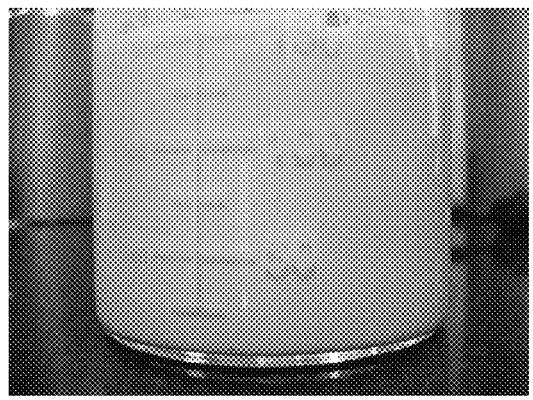
FIGS. 1A-1C are photographs of stability testing after hot rolling at three different temperatures for three treatment fluids according to certain embodiments wherein the treatment fluids contained a viscosifier and a stabilizer package.

As used herein, the words "comprise," "have," "include," and all grammatical variations thereof are each intended to have an open, non-limiting meaning that does not exclude additional elements or steps.

As used herein, the words "consisting essentially of," and all grammatical variations thereof are intended to limit the scope of a claim to the specified materials or steps and those that do not materially affect the basic and novel characteristic(s) of the claimed invention. For example, a test fluid can consist essentially of the base fluid, the viscosifier, and the stabilizer package. The test fluid can contain other ingredients so long as the presence of the other ingredients do not materially affect the basic and novel characteristics of the claimed invention, i.e., so long as the test fluid remains stable at the specified temperature.

As used herein, a "fluid" is a substance that can flow and conform to the outline of its container when the substance is tested at a temperature of 71° F. (22° C.) and a pressure of one atmosphere "atm" (0.1 megapascals "MPa"). A fluid can be a liquid or gas. A fluid can have only one phase or more than one distinct phase. A colloid is an example of a fluid having more than one distinct phase. A colloid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. There can be more than one dispersed phase of a colloid, but only one continuous phase. For example, there can be a continuous phase, which is adjacent to a first dispersed phase, and the first dispersed phase can be adjacent to a second dispersed phase. Moreover, any of the phases of a colloid can contain dissolved materials and/or undissolved solids.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

A well can include, without limitation, an oil, gas, or water production well, an injection well, or a geothermal well. As used herein, a "well" includes at least one wellbore. The wellbore is drilled into a subterranean formation. The subterranean formation can be a part of a reservoir or adjacent to a reservoir. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore, which can also contain a tubing string. A wellbore can contain one or more annuli. Examples of an annulus include, but are not limited to: the space between the wellbore and the outside of a tubing string in an open-hole wellbore; the space between the wellbore and the outside of a casing in a cased-hole wellbore; and the space between the inside of a first tubing string and the outside of a second tubing string, such as a casing. A treatment fluid can be introduced into a well to treat on or more portions of the well or formation.

It is often desirable to treat at least a portion of a well with a treatment fluid. As used herein, a "treatment fluid" is a fluid designed and prepared to resolve a specific condition of a well or subterranean formation, such as for drilling, completion, stimulation, isolation, gravel packing, or control of reservoir gas or water. The term "treatment fluid" refers to the specific composition of the fluid as it is being introduced into a wellbore. The term "treatment" in the term "treatment fluid" does not necessarily imply any particular action by the fluid.

During drilling operations, a wellbore is formed using a drill bit. A drill string can be used to aid the drill bit in drilling through a subterranean formation to form the wellbore. The drill string can include a drilling pipe. The drilling fluid may be circulated downwardly through the drilling pipe, and back up the annulus between the wellbore and the outside of the drilling pipe.

After the wellbore is formed, the well is then completed. This process is called well completion and includes a variety of treatment techniques designed to prepare the well for production of a reservoir fluid or injection of a fluid into the subterranean formation for enhanced recovery operations. A treatment fluid adapted for this purpose is called a completion fluid.

Additives are commonly included in a treatment fluid. The additives function to serve one or more purposes. By way of example, a viscosifier can be included in a treatment fluid to increase the viscosity of the fluid. Viscosity is a measure of the resistance of a fluid to flow, defined as the ratio of shear stress to shear rate. Viscosity can be expressed in units of (force*time)/area. For example, viscosity can be expressed in units of dyne*s/cm$^2$ (commonly referred to as Poise (P)), or expressed in units of Pascals/second (Pa/s). However, because a material that has a viscosity of 1 P is a relatively viscous material, viscosity is more commonly expressed in units of centipoise (cP), which is $\frac{1}{100}$ P. The viscosity of a material and its suspending properties are related. Generally, the higher the viscosity, the more easily undissolved solids will remain suspended in the fluid. Conversely, the lower the viscosity, the less easily the undissolved solids will remain suspended in the fluid. Undissolved solids that settle out of the fluid can create an unstable fluid. As used herein, the term "stable" and all grammatical variations thereof means a fluid that remains homogenous for a specified time period. As used herein, the term "homogeneous" means that less than 20% of undissolved particles settle out of the liquid phase of the fluid. By way of example, the majority of undissolved solids of a completion fluid do not settle to the bottom of the column of fluid. Therefore, it is desirable for a well treatment fluid to have a sufficient viscosity such that the treatment fluid is stable.

Viscosifiers used in the oil and gas industry are commonly a polymer. A polymer is a large molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain functional groups connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. The number of repeating units of a polymer is referred to as the chain length of the polymer. The number of repeating units of a polymer can range from approximately 11 to greater than 10,000. In a copolymer, the repeating units from each of the monomer residues can be arranged in various manners along the polymer chain. For example, the repeating units can be random, alternating, periodic, or block. The conditions of the polymerization reaction can be adjusted to help control the average number of repeating units (the average chain length) of the polymer. As used herein, a "polymer" can include a cross-linked polymer. As used herein, a "cross link" or "cross linking" is a connection between two or more polymer molecules. A cross-link between two or more polymer molecules can be formed by a direct interaction between the polymer molecules, or conventionally, by using a cross-linking agent that reacts with the polymer molecules to link the polymer molecules.

A polymer has an average molecular weight, which is directly related to the average chain length of the polymer. The average molecular weight of a polymer has an impact on some of the physical characteristics of a polymer, for example, its solubility and its dispersibility. For a copolymer, each of the monomers will be repeated a certain number of times (number of repeating units). The average molecular weight for a copolymer can be expressed as follows:

$$\text{Avg. molecular weight} = (M.W.m_1 * RUm_1) + (M.W.m_2 * RUm_2) \ldots$$

where $M.W.m_1$ is the molecular weight of the first monomer; $RU\ m_1$ is the number of repeating units of the first monomer; $M.W.m_2$ is the molecular weight of the second monomer; and $RU\ m_2$ is the number of repeating units of the second monomer. Of course, a terpolymer would include three monomers, a tetra polymer would include four monomers, and so on.

However, as wellbores are drilled in increasing depths into subterranean formations, the temperature that wellbore treatment fluids are subjected to has increased. For example, it is common for wellbore temperatures to be greater than 350° F. (177° C.), even up to 600° F. (316° C.). At these higher temperatures, the treatment fluid can become unstable.

The concentration of solids in the fluid at a particular location in the wellbore, among other things, determines the density of the fluid at that location. Therefore, the density of the fluid containing the settled solids can be much greater than the density of the fluid upstream (i.e., at a location closer to the wellhead). The density of the fluid at each location in the wellbore plays a role in the pressure differential between the fluid and the subterranean formation. For example, the density of the fluid can create an over-balanced, under-balanced, or balanced wellbore. As a result of the difference in density, the balance of the wellbore can become different at one or more locations in the wellbore. For example, the lower density fluid at the top of the column of fluid may provide an underbalance, whereas the higher density of fluid towards the bottom of the column of fluid may provide an overbalance. Therefore, it is desirable to have a stable fluid and consistent density throughout a column of fluid to prevent differences in the balance of the wellbore.

Instability of a wellbore treatment fluid can occur due to thermal degradation of a polymeric viscosifier. As the polymer degrades, the viscosity of the fluid is reduced, and undissolved solids can settle out of the liquid phase of the fluid. Previous attempts to solve the problem of thermal degradation include utilizing polymers that are thermally stable at certain temperatures. As used herein, the term "thermal stability", and all grammatical variations thereof, means that a significant portion of the polymer does not degrade or break down at a temperature less than or equal to the thermal stability temperature. However, the previous attempts do not provide a stable fluid at temperatures greater than about 350° F. (177° C.). Therefore, there exists a need for a treatment fluid viscosifier that can be used to provide a stable fluid at temperatures greater than 350° F. (177° C.) for a desired period of time.

It has been discovered that a stabilizer package can be added to a treatment fluid containing a polymeric viscosifier.

The viscosifier can be thermally-stable up to temperatures of about 325° F. (163° C.). The stabilizer package can increase the thermal stability of the polymer to temperatures greater than 350° F. (177° C.). One of the unique advantages of the stabilizer package is that it allows a polymeric viscosifier to be thermally stable at wellbore temperatures greater than temperatures of prior use with the same viscosifier without the stabilizer package. This allows for a stable fluid to be used at much higher wellbore temperatures than previously thought possible.

If any test (e.g., stability) requires the step of mixing, then the treatment fluid is mixed according to the following procedures. A known volume (in units of barrels) of the base fluid is added to a mixing container and the container is then placed on a mixer base. The motor of the base is then turned on and maintained at 11,000 revolutions per minute (rpm). The viscosifier, the stabilizer package, and any other ingredients are then added to the base fluid and mixed for at least 5 minutes. The ingredients can be added at a stated concentration of weight by volume of the treatment fluid, for example, in units of pounds per barrel of the treatment fluid. It is to be understood that any mixing is performed at ambient temperature and pressure (about 71° F. (22° C.) and about 1 atm (0.1 MPa)).

It is also to be understood that if any test (e.g., stability) requires the test to be performed at a specified temperature and possibly a specified pressure, then the temperature and pressure of the treatment fluid is ramped up to the specified temperature and pressure after being mixed at ambient temperature and pressure. For example, the treatment fluid can be mixed at 71° F. (22° C.) and 1 atm (0.1 MPa) and then placed into the testing apparatus and the temperature of the treatment fluid can be ramped up to the specified temperature. As used herein, the rate of ramping up the temperature is in the range of about 3° F./min to about 5° F./min (about 1.67° C./min to about 2.78° C./min) to simulate actual wellbore conditions. After the treatment fluid is ramped up to the specified temperature and possibly pressure, the treatment fluid is maintained at that temperature and pressure for the duration of the testing. The highest temperature that a fluid may be tested is dependent on the design capabilities of the specific instrument used. For example, some testing instruments are only capable of testing a fluid up to 450° F. (232° C.). Therefore, while it is desirable and believed that a fluid is thermally stable at higher temperatures (e.g., greater than 450° F.), it may be difficult or impossible to test at those higher temperatures. Such limitations however, do not render scientific theory regarding thermal stability unfounded or meaningless.

It is desirable that a treatment fluid remain stable for a desired amount of time. As used herein, "stability" testing is performed according to API 13I Recommended Practice for Laboratory Testing of Treatment Fluids, by placing the treatment fluid in a stainless steel ageing cell. The ageing cell is then pressurized with nitrogen gas to prevent the fluid from vaporizing and then placed in a hot rolling oven at a specified temperature. The container is then hot rolled at the specified temperature for a specified time. The ageing cell is then removed from the rolling oven and visually inspected to determine if the treatment fluid is stable (i.e., the fluid is homogenous and less than 20% of undissolved particles did not settle out of the base fluid).

Another desirable property of a treatment fluid is for the fluid to exhibit good rheology. Rheology is a measure of how a material deforms and flows. As used herein, the "rheology" of a treatment fluid is measured according to API 13B-2 section 6.3, Recommended Practice for Field Testing of Oil-based Treatment fluids as follows. The treatment fluid is mixed and allowed to static age for a specified period of time at a specified temperature. The treatment fluid is placed into the test cell of a rotational viscometer, such as a FANN® Model 35 viscometer, fitted with a Bob and Sleeve attachment and a spring number 1. The treatment fluid is tested at the specified temperature and ambient pressure, about 1 atm (0.1 MPa). Rheology readings are taken at multiple rpm's, for example, at 3, 6, 100, 200, 300, and 600.

The plastic viscosity ("PV") of a treatment fluid is obtained from the Bingham-Plastic rheological model and calculated as the difference between the 600 rpm and 300 rpm dial readings from the rheology testing, expressed in units of cP. A Bingham plastic is a viscoplastic material that behaves as a rigid body at low stresses but flows as a viscous fluid at high stresses. It is desirable to have a low PV for a treatment fluid.

The yield point ("YP") is defined as the value obtained from the Bingham-Plastic rheological model when extrapolated to a shear rate of zero. As used herein, the "yield point" of a treatment fluid is calculated as the difference between the plastic viscosity and the 300 rpm dial reading, expressed in units of $lb/100\ ft^2$. The yield point of a material is defined as the stress at which a material begins to deform plastically. Prior to reaching the yield point, the material will deform elastically and will return to its original shape when the applied stress is removed. However, once the yield point is exceeded, some fraction of the deformation will be permanent and non-reversible. Similarly, the yield stress or Tau zero is the stress that must be applied to a material to make it begin to flow (or yield), and may commonly be calculated from rheometer readings measured at rates of 3, 6, 100, 200, 300 and 600 rpm. The extrapolation in this case may be performed by applying a least-squares fit or curve fit to the Herchel-Bulkley rheological model. A more convenient means of estimating the yield stress is by calculating the low-shear yield point ("LSYP") by subtracting (2*the 3 rpm reading) from the 6 rpm reading, expressed in units of $lb/100\ ft^2$.

According to an embodiment, a treatment fluid for treating a portion of a high-temperature subterranean formation comprises: a base fluid, wherein the base fluid comprises water; a viscosifier, wherein the viscosifier is a polymer, and wherein the viscosifier is thermally stable up to a temperature of 325° F. (163° C.); and a stabilizer package, wherein the stabilizer package: (A) comprises a first stabilizer and a second stabilizer, wherein the first stabilizer is an oxygen scavenger and the second stabilizer is a pH adjustor; and (B) is capable of increasing the thermal stability of the viscosifier to a temperature greater than 350° F. (177° C.), wherein the portion of the subterranean formation has a bottomhole temperature greater than 350° F. (177° C.).

According to another embodiment, a method of treating a high-temperature subterranean formation comprises: introducing the treatment fluid into the portion of the subterranean formation, wherein the subterranean formation has a bottomhole temperature greater than 350° F. (177° C.).

The discussion of preferred embodiments regarding the treatment fluid or any ingredient in the treatment fluid, is intended to apply to the composition embodiments and the method embodiments. Any reference to the unit "gallons" means U.S. gallons.

The treatment fluid includes a base fluid. The treatment fluid can be a colloid, wherein the base fluid is the continuous phase of the treatment fluid. The colloid can be a slurry. Any of the phases of a colloid treatment fluid can include dissolved substances or undissolved solids.

The base fluid comprises water. The water can be selected from the group consisting of freshwater, brackish water, saltwater, and any combination thereof. The treatment fluid can further include a water-soluble salt. Preferably, the salt is selected from the group consisting of sodium chloride, calcium chloride, calcium bromide, potassium chloride, potassium bromide, magnesium chloride, sodium bromide, cesium formate, cesium acetate, and any combination thereof. The treatment fluid can contain the water-soluble salt in a concentration in the range of about 5% to about 25% by weight of the treatment fluid or in the range of about 10% to about 30% by weight of the water.

The treatment fluid includes a viscosifier. The viscosifier is a polymer. The viscosifier can be a copolymer. The viscosifier is also thermally stable up to a temperature of 325° F. (163° C.). The viscosifier can also be thermally stable up to a temperature greater than 325° F. (163° C.). According to an embodiment, the polymer is thermally stable at the specified temperature. The monomer residues can be selected such that the polymer is thermally stable at the specified temperature. The polymer can be a synthetic polymer. The polymer can also be a natural polymer that is derivatized to provide the requisite thermal stability of the polymer at the specified temperature. An example of a natural polymer according to this embodiment is a derivatized guar. The polymer can be derivatized polyacrylamide containing one or more functional groups, such as sulphonate groups, imides or N-vinyl pyrrolidone. According to an embodiment, the polymer comprises a monomer residue selected from the group consisting of 2-acrylamido-2-methylpropane sulfonic acid (AMPS®), acrylamide, acrylic acids or salts, and combinations thereof. Preferably, the polymer is a terpolymer comprising the monomer residues 2-acrylamido-2-methylpropane sulfonic acid (AMPS®), acrylamide, and acrylic acids or salts. It is to be understood that the polymer can comprise the monomer residues listed as well as other monomer residues not listed. According to an embodiment, the monomer residues are present in the following concentrations: AMPS® from about 15% to about 80%; acrylamide from about 20% to about 85%; and acrylic acid or salts from about 0% to about 10%, more preferably 60% AMPS®, 39.5% acrylamide, and 0.5% acrylic acid or salts, by weight of the polymer. It is also to be understood that the polymer can consists essentially of, or consist of, the monomer residues listed above. For example, the polymer can contain just the monomer residues listed above without additional monomer residues or functional groups being added to the polymer, for reasons such as affecting the hydrophobic or hydrophilic nature of the polymer or the viscosifying capability of the polymer. The polymer can have a molecular weight in the range of 500,000 to 2,000,000. The polymer can be water-soluble. According to another embodiment, the polymer is dispersible in the base fluid.

The treatment fluid further comprises the stabilizer package. The stabilizer package includes a first stabilizer and a second stabilizer. The first stabilizer is an oxygen scavenger. An oxygen scavenger can remove inactive impurities and unwanted reaction products (i.e., oxygen) to make sure that the oxygen will not undergo any unfavorable reactions. Without being limited by theory, it is believed that the first stabilizer functions to remove free radicals formed during thermal degradation of the polymer. As such, the first stabilizer is able to slow or substantially inhibit the amount of thermal degradation of the polymer compared to a fluid without the first stabilizer. The first stabilizer can be selected from the group consisting of sodium thiosulfate, an alkali metal thiosulfate, sodium dithionite, disodium phosphate, sodium sulfite, zinc sulfite, hydroquinone, hydrazine, diethylhydroxylamine, carbohydrazide, and combinations thereof. According to an embodiment, the first stabilizer is selected such that the polymer is thermally stable at the specified temperature.

The first stabilizer can be in a concentration of at least 0.5% by weight of the treatment fluid or at least 1% by weight of the water. The first stabilizer can also be in a concentration in the range of about 0.5% to about 5% by weight of the treatment fluid or about 1% to about 6% by weight of the water. According to an embodiment, the concentration of the first stabilizer is selected such that the polymer is thermally stable at the specified temperature.

The second stabilizer is a pH adjustor. The pH adjustor can be any compound that is capable of providing a pH of at least 8, more preferably at least 9 to the treatment fluid. The pH adjustor can be a base, a buffer, or an alkaline buffer. Without being limited by theory, it is believed that an acidic treatment fluid promotes and increases the rate at which the polymer degrades at higher temperatures. Therefore, by increasing the pH of the treatment fluid to the basic range, thermal instability of the polymer is prevented or the rate of thermal degradation of the polymer is significantly reduced. The second stabilizer can be selected from the group consisting of sodium bicarbonate, N-cyclohexyl-2-aminoethanesulfonic acid, borate, sodium carbonate, potassium carbonate, magnesium oxide, and combinations thereof. Preferably, the second stabilizer is sodium bicarbonate. According to an embodiment, the second stabilizer is selected such that the treatment fluid has a pH in the range of about 8.5 to 11, more preferably about 9 to 10, most preferably about 9 to 9.5. According to another embodiment, the second stabilizer is selected such that the polymer is thermally stable at the specified temperature.

The second stabilizer can be in a concentration of at least 0.1% by weight of the treatment fluid or at least 0.5% by weight of the water. The second stabilizer can also be in a concentration in the range of about 0.1% to about 5% by weight of the treatment fluid or about 0.5% to about 6% by weight of the water. According to an embodiment, the concentration of the second stabilizer is selected such that the treatment fluid has a pH in the range of about 8.5 to 11, more preferably about 9 to 10, most preferably about 9 to 9.5. According to another embodiment, the concentration of the second stabilizer is selected such that the polymer is thermally stable at the specified temperature.

It is to be understood that the selection and concentration of the first stabilizer and second stabilizer can be dependent on the specific polymer selected and the concentration of the viscosifier, such that the thermal stability of the viscosifier is increased to a temperature greater than 350° F. (177° C.). It is also to be understood that while the treatment fluid can contain other ingredients, it is the stabilizer package that is primarily or wholly responsible for causing the thermal stability of the viscosifier to increase to a temperature greater than 350° F. (177° C.). For example, a test fluid consisting essentially of, or consisting of, the base fluid, the viscosifier, and the stabilizer package and in the same proportions as the treatment fluid can exhibit an increase in the thermal stability temperature of the viscosifier to a temperature greater than 350° F. (177° C.); whereas a similar test fluid except without the stabilizer package would not have a polymer thermal stability of greater than the 350° F. (177° C.). Therefore, it is not necessary for the treatment fluid to include any other ingredients that would be responsible for the increase in thermal stability of the polymer.

The stabilizer package is capable of increasing the thermal stability of the viscosifier to a temperature greater than 350° F. (177° C.). The stabilizer package can also be capable of increasing the thermal stability of the viscosifier to a temperature greater than 400° F. (204° C.), preferably greater than 450° F. (232° C.). The stabilizer package can also be capable of increasing the thermal stability of the viscosifier to a temperature in the range of greater than 350° F. (177° C.) to about 600° F. (316° C.). It is to be understood that the polymeric viscosifier can be thermally stable up to a temperature of 325° F. (163° C.), but the increase in thermal stability is due to the addition of the stabilizer package. According to an embodiment, the stabilizer package increases the thermal stability of the viscosifier at least 25° F. (−4° C.), preferably at least 50° F. (10° C.), more preferably in the range of 25° F. (−4° C.) to about 300° F. (149° C.) compared to a fluid without the stabilizer package.

The selection and concentration of the first stabilizer and the second stabilizer can be sufficient such that the treatment fluid is stable for a desired period of time at a temperature greater than 350° F. (177° C.), preferably greater than 400° F. (204° C.), more preferably greater than 450° F. (232° C.). In another embodiment, the first stabilizer and the second stabilizer are selected and are in a sufficient concentration such that the treatment fluid is stable at the bottomhole temperature and pressure of the subterranean formation for a desired amount of time. As used herein, the term "bottomhole" means the portion of the subterranean formation to be treated or is treated. According to an embodiment, the desired amount of time is the time the treatment fluid is located in the well. The desired amount of time can be a time of at least 16 hours. The desired amount of time can also be a time in the range of about 16 hours to about 2 weeks.

The treatment fluid can have a plastic viscosity (PV) in the range of about 15 to about 25 centipoise (cP) at a temperature of 120° F. (49° C.). The treatment fluid can have a yield point (YP) of less than 25 pounds per 100 square feet (lb/100 ft$^2$) at a temperature of 120° F. (49° C.). The treatment fluid can have a low shear yield point (LSYP) greater than or equal to 1 lb/100 ft$^2$ at a temperature of 120° F. (49° C.). According to an embodiment, the first stabilizer and the second stabilizer are selected and in a sufficient concentration such that the treatment fluid exhibits the desired PV, YP, and LSYP at the specified temperature and testing conditions.

The treatment fluid can have a desired viscosity. Preferably, the desired viscosity is a sufficient viscosity such that the treatment fluid is stable at a temperature greater than 350° F. (177° C.) for a time of at least 16 hours. According to an embodiment, the viscosifier, first stabilizer, and second stabilizer are selected and in a sufficient concentration such that the treatment fluid has the desired viscosity at the specified temperature and time. According to another embodiment, the viscosifier, first stabilizer, and second stabilizer are selected and in a sufficient concentration such that the treatment fluid has a decrease in viscosity of less than 50%, more preferably less than 25% at a temperature greater than 350° F. (177° C.) for a time of at least 16 hours. According to yet another embodiment, the viscosifier, first stabilizer, and second stabilizer are selected and in a sufficient concentration such that the treatment fluid has a decrease in viscosity of less than 50%, more preferably less than 25% at the bottomhole temperature of the subterranean formation for a time of at least 16 hours.

The treatment fluid can be, without limitation, a drilling fluid, a packer fluid, a completion fluid, a spacer fluid, or a work-over fluid. Preferably, the treatment fluid is a completion fluid. The treatment fluid can be introduced prior to or after a second treatment fluid.

The treatment fluid can further include one or more other additives. The other additives can be any additive commonly used in treatment fluids for the wellbore operation to be performed. Examples of other additives include, but are not limited to, a weighting agent, a fluid loss additive, a bridging agent, a friction reducer, a light-weight additive, a defoaming agent, elastomers, a mechanical property enhancing additive, a lost-circulation material, a filtration-control additive, a gas migration control additive, a thixotropic additive, a viscosifying additive, thermal insulating particles, and combinations thereof.

According to the method embodiments, the methods include the step of introducing the treatment fluid into a portion of a subterranean formation, wherein the portion of the subterranean formation has a temperature greater than 350° F. (177° C.). The subterranean formation can be an oil, gas, or water reservoir or can be adjacent to the reservoir. The step of introducing the treatment fluid can be for the purpose of drilling a wellbore, completing the wellbore, stimulating the wellbore, or performing a work-over on the wellbore. The treatment fluid can be in a pumpable state before and during introduction into the portion of the subterranean formation. According to an embodiment, the subterranean formation is penetrated by a well, wherein at least a portion of the well has a bottomhole temperature greater than 350° F. (177° C.). The step of introducing can include introducing the treatment fluid into the well. The well can be an oil, gas, or water production well, an injection well, or a geothermal well. The well penetrating the subterranean formation can include an annulus. The step of introducing the treatment fluid can include introducing the treatment fluid into a portion of the annulus.

The methods can further include the step of introducing a cement composition into the well, wherein the step of introducing the cement composition is performed before or after the step of introducing the treatment fluid. As used herein, a "cement composition" is a mixture of at least cement and water, and possibly additives. As used herein, the term "cement" means an initially dry substance that, in the presence of water, acts as a binder to bind other materials together. An example of cement is Portland cement. The step of introducing the cement composition can be for the purpose of at least one of the following: well completion; foam cementing; primary or secondary cementing operations; well-plugging; and gravel packing. The cement composition can be in a pumpable state before and during introduction into the well. The methods can include the additional steps of perforating, fracturing, or performing an acidizing treatment, after the step of introducing the treatment fluid.

EXAMPLES

To facilitate a better understanding of the preferred embodiments, the following examples of certain aspects of the preferred embodiments are given. The following examples are not the only examples that could be given according to the preferred embodiments and are not intended to limit the scope of the invention.

For the data contained in the following tables, the concentration of any ingredient in a treatment fluid is expressed as a % by volume of the water (abbreviated as %) or pounds per barrel of the treatment fluid (abbreviated as "ppb").

Each of the treatment fluids were mixed and tested according to the procedure for the specific test as described in The Detailed Description section above. Each treatment fluid had a density of 11 pounds per gallon (1.32 kilograms per liter "kg/L"). BARACARB® 5 and BARACARB® 25 are ground marble bridging agents having a particle size of 5 and 25 micrometers, respectively; BARABUF® is a pH buffer; and a high-temperature filtration control agent. BARACARB®, BARACARB® 25, and BARABUF® are marketed by Halliburton Energy Services, Inc.

Table 1 contains the ingredients and concentration of each ingredient for three treatment fluids. Table 1 also contains plastic viscosity (PV), yield point (YP), and low shear yield point, and the hot rolling temperature for treatment fluids #1-#3. Each fluid was hot rolled for 16 hours at the listed temperature and then cooled to a testing temperature of 120° F. (49° C.). The viscosifier was a terpolymer of 2-acrylamido-2-methylpropane sulfonic acid (AMPS®), acrylamide, and acrylic acids or salts. The first stabilizer was sodium thiosulfate, and the second stabilizer was sodium bicarbonate.

TABLE 1

| Ingredient | Treatment Fluid # | | |
| --- | --- | --- | --- |
| | 1 | 2 | 3 |
| NaCl | 14.2% | 14.2% | 14.2% |
| Viscosifier | 0.7 ppb | 0.7 ppb | 1 ppb |
| Water | 279 mL | 279 mL | 279 mL |
| BARACARB® 5 | 8.96% | 8.96% | 8.96% |
| BARACARB® 25 | 3.84% | 3.84% | 3.84% |
| BARABUF® | 0.24% | 0.24% | 0.24% |
| First Stabilzer | 0.93% | 0.93% | 1.17% |
| Second Stabilizer | 0.49% | 0.49% | 0.64% |
| High-Temp filtration ctl agent | 1.16% | 1.16% | 1.16% |
| Hot Rolling Temp (° F.) | 350 | 400 | 450 |
| PV (cP) | 15 | 15 | 17 |
| YP (lb/100 sq. ft.) | 8 | 8 | 11 |
| LSYP (lb/100 sq. ft.) | 1 | 1 | 1 |

As can be seen in Table 1, each of the fluids exhibited very good PV, YP, and LSYP. This indicates that the stabilizer package is capable of increasing the thermal stability of the viscosifier to a temperature greater than 350° F. (177° C.). Less than 10% settling was observed for the treatment fluids, which is better than the 20% considered acceptable for a homogenous fluid.

Figure 1B:
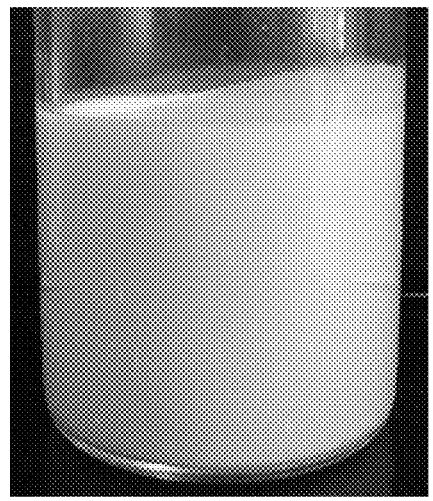
Figure 1C:
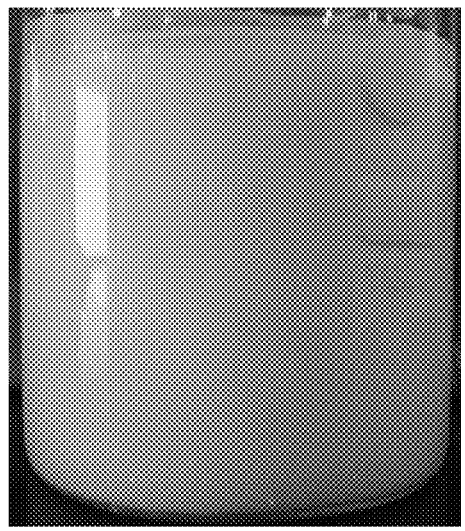
Figure 2:
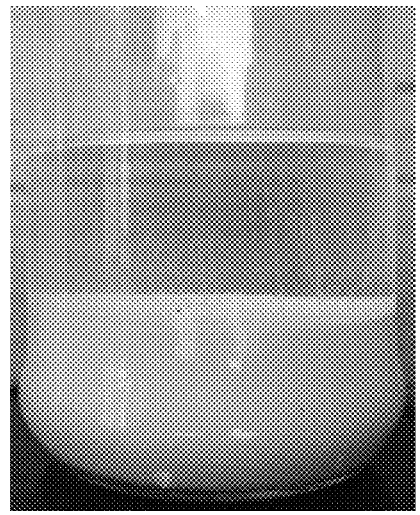
FIG. 2 is a photograph of stability testing after hot rolling at a temperature of 450° F. (232° C.) for a treatment fluid without the stabilizer package.

The Figures are photographs of the fluids after hot rolling at each fluid's corresponding hot rolling temperature listed in Table 1 to show the stability of the fluids. FIGS. 1A, 1B, and 1C are photographs of treatment fluids #1, #2, and #3 respectively. FIG. 2 is a photograph of a control treatment fluid containing the same ingredients and concentrations of treatment fluid #3, except without the stabilizer package (i.e., without any of the first stabilizer or second stabilizer). The control fluid of FIG. 2 was also hot rolled at a temperature of 450° F. (232° C.), just like treatment fluid #3.

As can be seen in the Figures, treatment fluids #1-#3 exhibited exceptional stability, even at a temperature of 450° F. (232° C.). However, as can be seen in FIG. 2, the control fluid without the stabilizer package exhibited very poor stability. This indicates that the stabilizer package increases the thermal stability of the polymeric viscosifier considerably. That is, the fluid without the stabilizer package exhibited little to no stability; whereas, the fluids with the stabilizer package exhibited exceptional stability. It is theorized that the stabilizer package can also provide thermal stability to the viscosifier at temperatures greater than 450° F. (232° C.); however, the instrument used for testing stability had a maximum testing temperature of 450° F. (232° C.). Therefore, it was not possible to test the fluid's stability at a temperature in excess of 450° F. (232° C.).

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of treating a portion of a subterranean formation comprising:

introducing a treatment fluid into the portion of the subterranean formation, wherein the portion of the subterranean formation has a bottomhole temperature greater than 350° F., wherein the treatment fluid is stable at a temperature greater than 400° F., and wherein the treatment fluid comprises:

(A) a base fluid, wherein the base fluid comprises water;
(B) a viscosifier, wherein the viscosifier is a terpolymer, wherein the terpolymer comprises the monomer residues 2-acrylamido-2-methylpropane sulfonic acid, acrylamide, and acrylic acid, wherein the terpolymer has a molecular weight in the range of 500,000 to 2,000,000, and wherein the viscosifier is thermally stable up to a temperature of 325° F.; and
(C) a stabilizer package, wherein the stabilizer package:
 (i) comprises a first stabilizer and a second stabilizer, wherein the first stabilizer is an oxygen scavenger and the second stabilizer is a pH adjustor; and
 (ii) increases the thermal stability of the viscosifier to a temperature greater than 400° F.

2. The method according to claim 1, wherein the water is selected from the group consisting of freshwater, brackish water, saltwater, and any combination thereof.

3. The method according to claim 1, wherein the concentration of the monomer residues is selected such that the terpolymer is thermally stable up to a temperature of 325° F.

4. The method according to claim 1, wherein the monomer residues are present in the following concentrations: 2-acrylamido-2-methylpropane sulfonic acid from about 15% to about 80%; acrylamide from about 20% to about 85%; and acrylic acid from about 0% to about 10% by weight of the terpolymer.

5. The method according to claim 1, wherein the first stabilizer is selected from the group consisting of sodium thiosulfate, an alkali metal thiosulfate, sodium dithionite, disodium phosphate, sodium sulfite, zinc sulfite, hydroquinone, hydrazine, diethylhydroxylamine, carbohydrazide, and combinations thereof.

6. The method according to claim 1, wherein the first stabilizer is sodium thiosulfate.

7. The method according to claim 1, wherein the first stabilizer is selected and is in a sufficient concentration such that the polymer is thermally stable at a temperature greater than 400° F.

8. The method according to claim 1, wherein the first stabilizer is in a concentration in the range of about 0.5% to about 5% by weight of the treatment fluid.

9. The method according to claim 1, wherein the second stabilizer is selected and is in a sufficient concentration such that the treatment fluid has a pH in the range of about 8.5 to 11.

10. The method according to claim 1, wherein the pH adjustor is a compound that is capable of providing a pH of at least 9 to the treatment fluid.

11. The method according to claim 1, wherein the pH adjustor is a base, a buffer, or an alkaline buffer.

12. The method according to claim 1, wherein the second stabilizer is selected from the group consisting of sodium bicarbonate, N-cyclohexyl-2-aminoethanesulfonic acid, borate, sodium carbonate, potassium carbonate, magnesium oxide, and combinations thereof.

13. The method according to claim 1, wherein the second stabilizer is sodium bicarbonate.

14. The method according to claim 1, wherein the second stabilizer is selected and is in a sufficient concentration such that the polymer is thermally stable at a temperature greater than 400° F.

15. The method according to claim 1, wherein the second stabilizer is in a concentration in the range of about 0.1% to about 5% by weight of the treatment fluid.

16. The method according to claim 1, wherein the stabilizer package increases the thermal stability temperature of the viscosifier by a temperature in the range of 25° F. to about 300° F.

17. The method according to claim 1, wherein the first stabilizer and the second stabilizer are selected and are in a sufficient concentration such that the treatment fluid is stable at the bottomhole temperature and pressure of the subterranean formation for a desired amount of time.

18. The method according to claim 1, wherein the subterranean formation is penetrated by a well, wherein at least a portion of the well has a bottomhole temperature greater than 350° F.

* * * * *